(12) United States Patent
Kawabe et al.

(10) Patent No.: US 8,731,874 B2
(45) Date of Patent: May 20, 2014

(54) THREE-DIMENSIONAL CAD MODEL CREATING APPARATUS AND PROGRAM

(75) Inventors: Shin Kawabe, Chiyoda-ku (JP); Shinya Itagaki, Chiyoda-ku (JP); Osamu Makino, Chiyoda-ku (JP); Koichi Nanno, Chiyoda-ku (JP); Takeharu Kondo, Chiyoda-ku (JP); Masaaki Yamada, Chiyoda-ku (JP); Shiro Ikeda, Chiyoda-ku (JP); Rio Sato, Chiyoda-ku (JP); Masafumi Oguri, Chiyoda-ku (JP)

(73) Assignee: Mitsubishi Electric Coproration, Chiyoda-Ku, Tokyo (JP)

( * ) Notice: Subject to any disclaimer, the term of this patent is extended or adjusted under 35 U.S.C. 154(b) by 395 days.

(21) Appl. No.: 13/057,302

(22) PCT Filed: Aug. 8, 2008

(86) PCT No.: PCT/JP2008/064361
§ 371 (c)(1),
(2), (4) Date: Feb. 3, 2011

(87) PCT Pub. No.: WO2010/016148
PCT Pub. Date: Feb. 11, 2010

(65) Prior Publication Data
US 2011/0137620 A1 Jun. 9, 2011

(51) Int. Cl.
G06F 17/50 (2006.01)
G06F 11/22 (2006.01)
G06F 19/00 (2011.01)
G06T 15/00 (2011.01)
G06T 17/00 (2006.01)

(52) U.S. Cl.
USPC .......... 703/1; 700/182; 700/97; 700/98; 716/136; 345/419; 345/420

(58) Field of Classification Search
USPC ............ 703/1; 716/136; 700/182, 97, 98; 345/419, 420
See application file for complete search history.

(56) References Cited

U.S. PATENT DOCUMENTS

2002/0055825 A1* 5/2002 Maeda et al. .............. 703/1
2007/0078634 A1* 4/2007 Krishnapillai ............. 703/1

FOREIGN PATENT DOCUMENTS

JP 9-016382 1/1997
JP 11-212779 A 8/1999

(Continued)

OTHER PUBLICATIONS

Brian Ekins, NPL, "Automating Autodesk Inventor Parameters with the API", Nov. 30, 2005.*

(Continued)

*Primary Examiner* — Omar Fernandez Rivas
*Assistant Examiner* — Angel Calle
(74) *Attorney, Agent, or Firm* — Buchanan Ingersoll & Rooney PC

(57) ABSTRACT

Included are a table creating unit that creates, for a three-dimensional CAD model, tabular data that describes change logic for each changed state, the change logic associating a changed state with a condition to be satisfied to shift to the changed state, the changed state being a form after transformation of the three-dimensional CAD model; a data converting unit that converts each change logic set in the created tabular data into a description in a certain program language, and creates a model built-in program; an model built-in program IO unit that registers the converted model built-in program to the three-dimensional CAD model; and a three-dimensional CAD software-program unit that transforms the three-dimensional CAD model when receiving an operation for transforming the three-dimensional CAD model, based on the operation and a change logic described in a model built-in program registered to the three-dimensional CAD model.

7 Claims, 10 Drawing Sheets

(56) References Cited

FOREIGN PATENT DOCUMENTS

| | | |
|---|---|---|
| JP | 2001-282867 A | 10/2001 |
| JP | 2001-338001 A | 12/2001 |
| JP | 2005-078207 A | 3/2005 |
| JP | 2005-293014 A | 10/2005 |
| JP | 2006-146369 A | 6/2006 |

OTHER PUBLICATIONS

Yigang wang, NPL, "3D CAD Modeling Using Automatically Reconstructable Assemblies", 2007.*

International Search Report (PCT/ISA/210) issued on Oct. 21, 2008, by Japanese Patent Office as the International Searching Authority for International Application No. PCT/JP2008/064361.

Written Opinion (PCT/ISA/237) issued on Oct. 21, 2008, by Japanese Patent Office as the International Searching Authority for International Application No. PCT/JP2008/064361.

Feb. 18, 2014 European Search Report issued in European Application No. 08808881.0.

"Interaction with Constraints in 3D Modeling," Wolfgang, Sohrt et al., Department of Computer Science, University of Utah, pp. 387-396, XP40054129A.

* cited by examiner

FIG.2

TABLE NAME: "PART OUTER DIMENSIONS" (101)

| CATEGORY | BRANCHING CONDITIONS | | | BRANCHED RESULTS (104) | | |
|---|---|---|---|---|---|---|
| EXPLANATION | CALL SIZE | OPTION | LOAD FORCE | LOAD FORCE | PART WIDTH | PART DEPTH | PART HEIGHT |
| VARIABLE NAME | SIZE | OPTION | FORCE | FORCE | WIDTH | DEPTH | HEIGHT |
| LOGIC | == | == | >= | < | = | = | = |
| VALUE | "LARGE" | "N/A" | 0 | 100 | 1000 | 300 | 20 |
| VALUE | "LARGE" | "N/A" | 100 | 200 | 1500 | 300 | 20 |
| VALUE | "LARGE" | "APPLIED" | 0 | 100 | 1000 | 350 | 20 |
| VALUE | "LARGE" | "APPLIED" | 100 | 200 | 1500 | 350 | 25 |
| VALUE | "SMALL" | "N/A" | 0 | 100 | 500 | 250 | 18 |
| VALUE | "SMALL" | "N/A" | 100 | 200 | 700 | 250 | 18 |
| VALUE | "SMALL" | "APPLIED" | 0 | 100 | 500 | 270 | 18 |
| VALUE | "SMALL" | "APPLIED" | 100 | 200 | 700 | 270 | 20 |

END (102, 103)

FIG.3

```
'HYO::PART OUTER DIMENSIONS ~201
'NUMBER OF COLUMNS::8
'NUMBER OF ROWS::12
'BRANCHED RESULT STARTING COLUMN::6
'EXPLANATION::CALL SIZE,OPTION,LOAD FORCE,,PART WIDTH,
PART DEPTH,PART HEIGHT
'VARIABLE NAME::SIZE,OPTION,FORCE,FORCE,WIDTH,DEPTH,HEIGHT
'
IF SIZE=="LARGE" THEN
IF OPTION=="N/A" THEN
IF FORCE>=0 THEN
IF FORCE<=100 THEN
WIDTH=1000
DEPTH=300
HEIGHT=20
ENDIF
ENDIF
ENDIF
ENDIF
       .
       .
       .
IF SIZE=="SMALL" THEN
IF OPTION=="APPLIED" THEN
IF FORCE>=100 THEN
IF FORCE<=200 THEN
WIDTH=1000
DEPTH=300
HEIGHT=20
ENDIF
ENDIF
ENDIF
ENDIF
'
'HYOEND:: ~206
```

202 encompasses the header lines; 204 the first IF block; 205 the second IF block; 203 the overall body.

| TABLE NAME | "PART OUTER DIMENSIONS" | | | | | | | |
|---|---|---|---|---|---|---|---|---|
| CATEGORY | BRANCHING CONDITIONS | | | | BRANCHED RESULTS | | | END |
| EXPLANATION | CALL SIZE | OPTION | LOAD FORCE | | PART WIDTH | PART DEPTH | PART HEIGHT | |
| VARIABLE NAME | SIZE | OPTION | FORCE | FORCE | WIDTH | DEPTH | HEIGHT | |
| LOGIC | == | == | >= | < | = | = | = | |
| VALUE | "LARGE" | "N/A" | 0 | 100 | A | 300 | 20 | |
| VALUE | "LARGE" | "N/A" | 100 | 200 | A+500 | 300 | 20 | |
| VALUE | "LARGE" | "APPLIED" | 0 | 100 | A | 350 | 20 | |
| VALUE | "LARGE" | "APPLIED" | 100 | 200 | A+500 | 350 | 25 | |
| VALUE | "SMALL" | "N/A" | 0 | 100 | A | 250 | 18 | |
| VALUE | "SMALL" | "N/A" | 100 | 200 | A+200 | 250 | 18 | |
| VALUE | "SMALL" | "APPLIED" | 0 | 100 | A | 270 | 18 | |
| VALUE | "SMALL" | "APPLIED" | 100 | 200 | A+200 | 270 | 20 | |
| END | | | | | | | | |

(b)

```
'HYO::PART OUTER DIMENSIONS
'NUMBER OF COLUMNS::8
'NUMBER OF ROWS::12
'BRANCHED RESULT STARTING COLUMN::6
'EXPLANATION::CALL SIZE,OPTION,LOAD FORCE,,PART WIDTH,
PART DEPTH,PART HEIGHT
'VARIABLE NAME::SIZE,OPTION,FORCE,FORCE,WIDTH,DEPTH,HEIGHT

IF SIZE=="LARGE" THEN
IF OPTION=="N/A" THEN
IF FORCE>=0 THEN
IF FORCE<=100 THEN
WIDTH=A
DEPTH=300
HEIGHT=20
ENDIF
ENDIF
ENDIF
ENDIF
        .
       ·|
        .
IF SIZE=="SMALL" THEN
IF OPTION=="APPLIED" THEN
IF FORCE>=100 THEN
IF FORCE<200 THEN
WIDTH=A+200
DEPTH=300
HEIGHT=20
ENDIF
ENDIF
ENDIF
ENDIF

'HYOEND::
```

FIG.5

```
TABLE NAME,"PART OUTER DIMENSIONS",,,,,,,,
CATEGORY,BRANCHING CONDITIONS,,,,BRANCHED RESULTS,,,END
EXPLANATION,CALL SIZE,OPTION,LOAD FORCE,,PART WIDTH,
PART DEPTH,PART HEIGHT,
VARIABLE NAME,SIZE,OPTION,FORCE,FORCE,WIDTH,DEPTH,HEIGHT,
LOGIC,==,==,>=,<,=,=,=,
VALUE,"LARGE","N/A",0,100,1000,300,20,
VALUE,"LARGE","N/A",100,200,1500,300,20,
VALUE,"LARGE","APPLIED",0,100,1000,350,20,
VALUE,"LARGE","APPLIED",100,200,1500,350,25,
VALUE,"SMALL","N/A",0,100,500,250,18,
VALUE,"SMALL","N/A",100,200,700,250,18,
VALUE,"SMALL","APPLIED",0,100,500,270,18,
VALUE,"SMALL","APPLIED",100,200,700,270,20,
END
```

FIG.8

TABLE NAME: "PRESENCE/ABSENCE LOGIC FOR COMPONENT (SHAPE, PART)" ⌐101

| CATEGORY | BRANCHING CONDITIONS | END ⌐102 |
|---|---|---|
| EXPLANATION | | |
| VARIABLE NAME | | |
| LOGIC | | |
| SHAPE ELEMENT 1 | | |
| SHAPE ELEMENT 2 | | |
| SHAPE ELEMENT 3 | | |
| SHAPE ELEMENT 4 | | |
| SHAPE ELEMENT 5 | | |
| SHAPE ELEMENT 6 | | |
| SHAPE ELEMENT 7 | | |
| SHAPE ELEMENT 8 | | |

END ⌐103

301 brackets SHAPE ELEMENT 1–8

FIG.9

TABLE NAME: "PRESENCE/ABSENCE LOGIC FOR COMPONENT (SHAPE, PART)"

| CATEGORY | BRANCHING CONDITIONS | | | | END |
|---|---|---|---|---|---|
| EXPLANATION | CALL SIZE | OPTION | LOAD FORCE | | ~105 |
| VARIABLE NAME | SIZE | OPTION | FORCE | FORCE | ~106 |
| LOGIC | == | == | >= | < | ~107 |
| SHAPE ELEMENT 1 | | | | | |
| SHAPE ELEMENT 2 | | "APPLIED" | | | |
| SHAPE ELEMENT 3 | "LARGE" | | | | |
| 302 | | "APPLIED" | | | |
| SHAPE ELEMENT 4 | | | | | |
| SHAPE ELEMENT 5 | | | | | |
| SHAPE ELEMENT 6 | | | | | |
| SHAPE ELEMENT 7 | | | | 0 | 100 |
| SHAPE ELEMENT 8 | | | | 100 | 200 |

END 301 brackets SHAPE ELEMENT 1–8

FIG.10

TABLE NAME "PRESENCE/ABSENCE LOGIC FOR COMPONENT (SHAPE, PART)"

| EXPLANATION | | SIZE LARGE | OPTION APPLIED | LOAD FORCE | LOAD FORCE | LOAD FORCE | LOAD FORCE | END |
|---|---|---|---|---|---|---|---|---|
| LOGIC | NO CONDITION | SIZE== "LARGE" | OPTION== "APPLIED" | FORCE>= 0 | FORCE< 100 | FORCE>= 100 | FORCE< 200 | |
| SHAPE ELEMENT 1 | ○ | | | | | | | |
| SHAPE ELEMENT 2 | | | ○ | | | | | |
| SHAPE ELEMENT 3 | | ○ | ○ | | | | | |
| SHAPE ELEMENT 4 | ○ | | | | | | | |
| SHAPE ELEMENT 5 | ○ | | | | | | | |
| SHAPE ELEMENT 6 | ○ | | | | | | | |
| SHAPE ELEMENT 7 | | | | ○ | ○ | | | |
| SHAPE ELEMENT 8 | | | | | | ○ | ○ | |

END

FIG.11
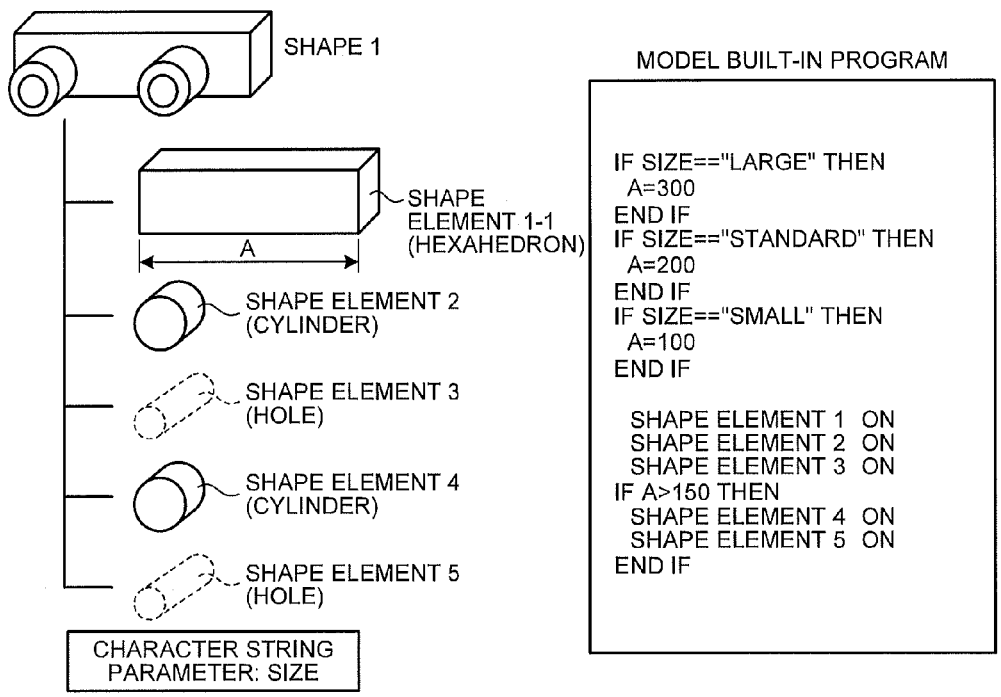
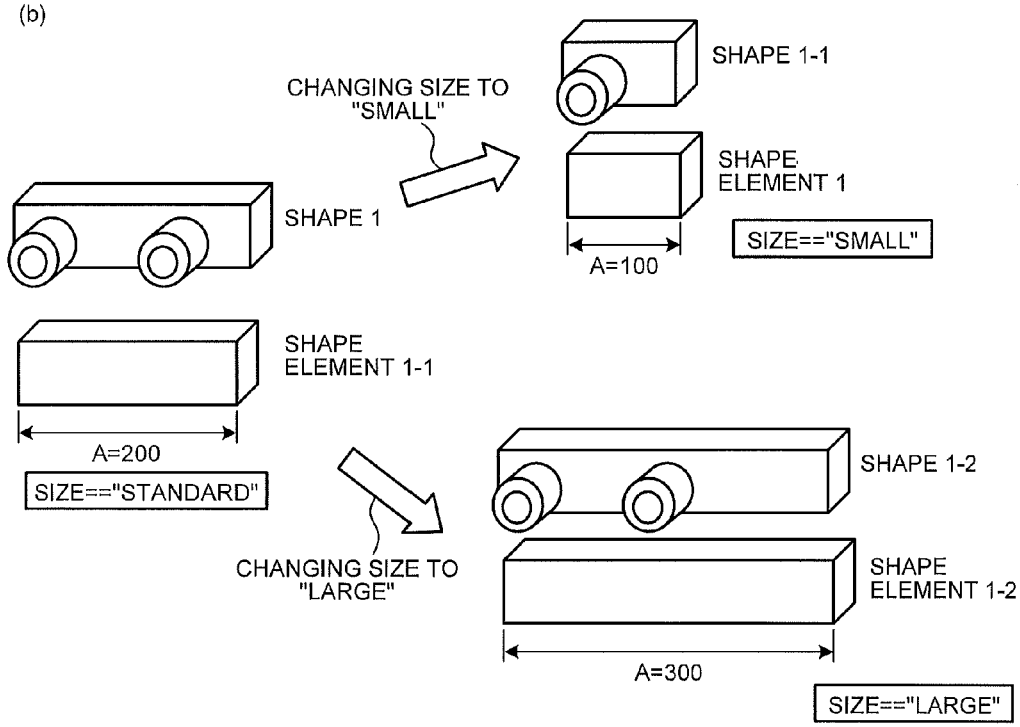

THREE-DIMENSIONAL CAD MODEL CREATING APPARATUS AND PROGRAM

TECHNICAL FIELD

The present invention relates to a three-dimensional CAD model creating apparatus that includes a parametric transformation function and a function of setting change logic, and a program.

BACKGROUND ART

Generally, a recent three-dimensional CAD software program that creates a three-dimensional CAD model implements a parametric transformation function, which can transform a dimension of a shape element included in the three-dimensional CAD model as desired by changing the value of a dimensional parameter of the shape element (hereinafter, simply a parameter). Moreover, according to the parametric transformation function, a plurality of parameters can be caused to have a dependence on each other by setting the parameters with a same expression or different expressions using a same variable. In addition, positional relation between shape elements can be used as a parameter.

Furthermore, recent three-dimensional CAD software programs have a function of causing a three-dimensional CAD model to have a program, providing complicated branching conditions by setting the program (hereinafter, referred to as the model built-in program), and setting change logic that associates a changed state, which is a form after transformation, with a condition to be satisfied to shift to the changed state (hereinafter, the function is referred to as a programmed transformation function). According to the function, an expression in which dependence between parameters is set, presence or absence of shape element, or the like, can be changed in accordance with a conditional branch based on a desired parameter, for example.

As a technology relevant to a three-dimensional CAD having the parametric transformation function, there is a technology for improving user operation in visibility by making an input unit for a parameter value into a tabular form (for example, see Patent Document 1 and Patent Document 2). Moreover, there is a technology of enabling a spreadsheet software program to be used as a unit for inputting a parameter by causing the spreadsheet software program and a three-dimensional CAD software program to coordinate (for example, see Patent Document 3).

Patent Document 1: Japanese Patent Application Laid-open No. 2001-338001
Patent Document 2: Japanese Patent Application Laid-open No. 2005-293014
Patent Document 3: Japanese Patent Application Laid-open No. 2005-78207

DISCLOSURE OF INVENTION

Problem to be Solved by the Invention

The model built-in program described above is created with a text editor using an IF sentence and/or other sentences in a program language, such as BASIC, and is incorporated into a three-dimensional CAD model. However, not all users in various fields who use a three-dimensional CAD software program, such as construction designers and machinery designers, are expert in programming as described above. For this reason, a mistake is often made in description of a model built-in program, and a debugging environment for the model built-in program is insufficient, consequently, there is a problem in that improper operation of shape transformation can be made on the value of a parameter input into a CAD in an actual use.

Moreover, there is a problem in that when performing maintenance or a diversion of a three-dimensional CAD model, a user other than the user who creates the model built-in program needs to read comprehensively descriptions of the model built-in program to understand change logic defined in the model, thereby resulting in extremely poor efficiency. Furthermore, there is a problem in that when preparing specifications to explain details of a model built-in program, lots of work are required to ensure unique association between a three-dimensional CAD model and the specifications because the specifications are manually produced.

The technologies according to Patent Documents 1 to 3 are technologies for assisting input of a parameter, and not for assisting setting of change logic.

The present invention has been made in the light of the above, and an object of the present invention is to obtain a three-dimensional CAD model creating apparatus and a program that can easily set change logic.

Means for Solving Problem

An aspect of the present invention includes: a table creating unit that creates, for a three-dimensional CAD model, tabular data that describes change logic for each changed state, the change logic associating a changed state with a condition to be satisfied to shift to the changed state, the changed state being a form after transformation of the three-dimensional CAD model; a data converting unit that converts each change logic set in the created tabular data into a description in a certain program language, and creates a model built-in program; an model built-in program IO unit that registers the converted model built-in program to the three-dimensional CAD model; and a three-dimensional CAD software-program unit that transforms the three-dimensional CAD model when receiving an operation for transforming the three-dimensional CAD model, based on the operation and a change logic described in a model built-in program registered to the three-dimensional CAD model.

Effect of the Invention

According to the present invention, there is an effect that change logic can be easily set.

BRIEF DESCRIPTION OF DRAWINGS

FIG. 2 is a exemplar display of tabular data regarding change logic setting of parametric transformation.

FIG. 3 is an example of change logic setting part of parametric transformation of model built-in program data.

FIG. 4 is a display example of tabular data regarding change logic setting of parametric transformation including a mathematical expression and an example of model built-in program data.

FIG. 5 is an example of stored tabular data in a storage unit.

FIG. 8 is a schematic diagram that depicts a list of shape elements.

FIG. 9 is an exemplar display of tabular data in which setting of change logic regarding presence or absence of shape element is described.

FIG. 10 is another exemplar display of tabular data in which setting of change logic regarding presence or absence of shape element is described.

FIG. 11 is a schematic diagram explaining a function of a conventional three-dimensional CAD software program.

EXPLANATIONS OF LETTERS OR NUMERALS

Figure 1:
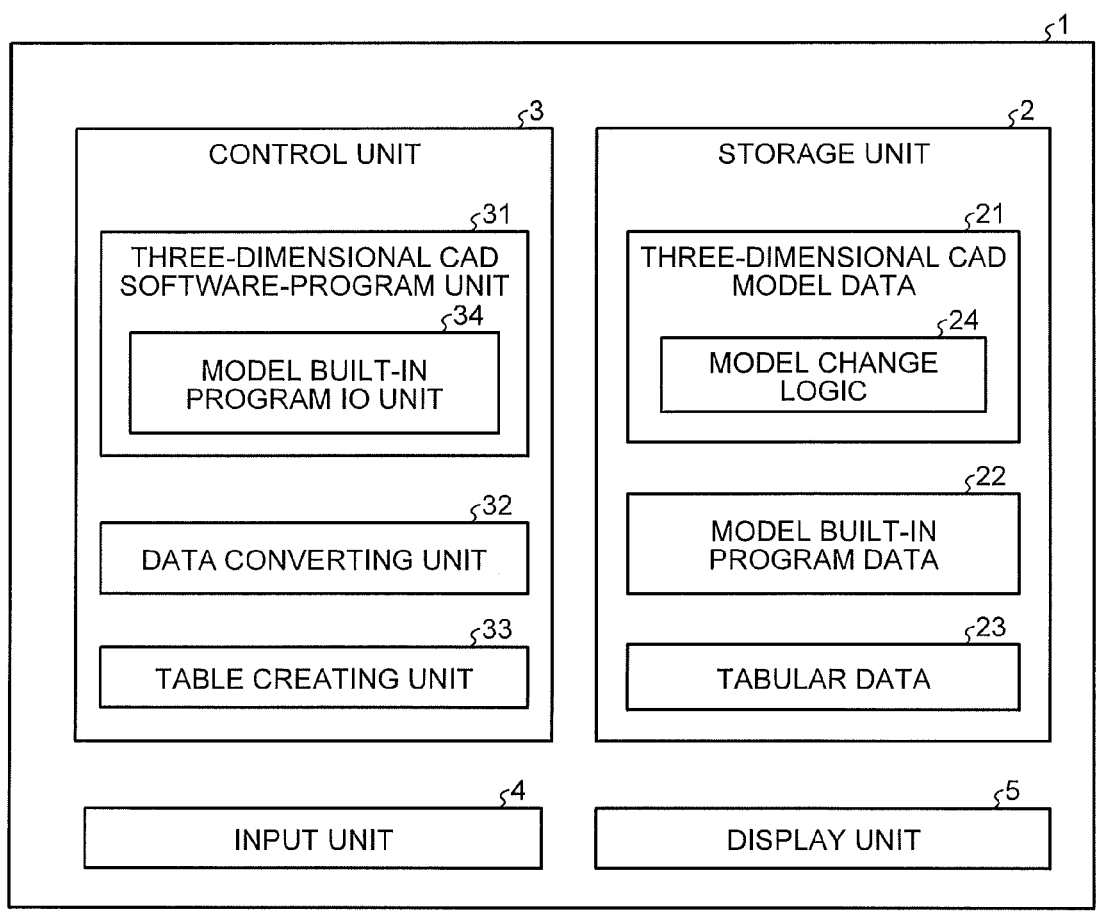
FIG. 1 is a schematic diagram that depicts a configuration of a three-dimensional CAD model-creating apparatus according to a first embodiment.

1 Three-dimensional CAD model creating apparatus
2 Storage unit
3 Control unit
4 Input unit
5 Display unit
21 Three-dimensional CAD model data
22 Model built-in program data
23 Tabular data
24 Model change logic
31 Three-dimensional CAD software-program unit
32 Data converting unit
33 Table creating unit
34 Model built-in program IO unit
101 Table-name indicating row
102, 103 Ending index
104 Branched-result column index
105 Explanation row
106 Variable name row
107 Logic row
108 Value setting row
201 Table-starting comment row
202 Table-attribution comment row
203 Logic description row
204 Conditional branching logic
205 Conditional branching logic
206 Table-ending comment row
301 Shape element list
302 Additional row
401 Value setting row
407 Logic row

BEST MODE(S) FOR CARRYING OUT THE INVENTION

To help understanding, first of all, a parametric transformation function and a programmed transformation function are explained below. FIG. 11 is a conceptual diagram explaining an example when using a parametric transformation function and a program transformation function included in a conventional three-dimensional CAD software program.

FIG. 11 (a) depicts an example of a configuration of a three-dimensional CAD model created by a conventional three-dimensional CAD software program, and an example of a model built-in program corresponding to the model. In FIG. 11 (a), a shape 1 of the three-dimensional CAD model is formed as an operator (user) of the three-dimensional CAD software program creates a shape element 1, a shape element 2, a shape element 3, a shape element 4, and a shape element 5 in order, and adds them into three-dimensional CAD data.

According to the example, the shape element 1 is a hexahedron, and has three parameters, namely, width, depth, and height. For example, if a parameter indicating the width is given with a parameter name A, upon changing the parameter A from 100 to 200, the shape element 1 can be transformed so as to change the width thereof from 100 to 200. Accordingly, the width of the shape element 1 can be parametrically transformed. Moreover, in addition to the parameter indicating the width, for example, by giving an expression using A to a parameter indicating the depth, both of the width and the depth can be transformed in a linked manner by changing A. In other words, the width and the depth can be caused to have a dependence on each other. In addition, positional relation between shape elements can be set as a variable, and a shape can be transformed in accordance with the variable.

In the model built-in program according to the example, change logic regarding parametric transformation, which is branching conditions of an expression of dependence between parameters, is set by descriptions from the first row to the ninth row. More specifically, a parameter "SIZE" storing a character string is used, and when "large", "standard", or "small" is stored in "SIZE", the value of A is to be 300, 200, or 100, respectively, in accordance with conditional branches. A change logic regarding presence or absence of shape element is set by descriptions from the 11th row to the 17th row. That is, it is set that the shape elements 1 to 3 are always "present", and the shape elements 4 and 5 are "present" only when the value of A exceeds 150.

FIG. 11 (b) is a schematic diagram for explaining how the shape 1 is transformed in accordance with the setting of the model built-in program shown in FIG. 11 (a). According to FIG. 11 (b), when the value of the parameter "SIZE" is changed from "standard" to "small", the value of the parameter A is changed from 200 to 100 by the operation of the model built-in program shown in FIG. 11 (a). Furthermore, the shape element 4 and the shape element 5 turn ineffective in the model because of a conditional branch in accordance with the level of the value of the parameter A, so that the shape 1 changes to the shape 1-1. Similarly, when the value of the parameter "SIZE" is changed from "standard" to "large", only the value of the parameter A is changed while the shape elements 4 and 5 remain effective, so that the shape 1 changes to the shape 1-2. In this way, according to the programmed transformation function, change in dependence between parameters and presence or absence of a shape element can be set.

According to the conventional three-dimensional CAD software program including the parametric transformation function and the programmed transformation function as described above, when a user uses those functions, a very inconvenient method is needed, for example, the user directly creates the above model built-in program by using a text editor. Embodiments of the present invention mainly features creating a model built-in program from conditional branches and branched results input in a tabular form, so that even a user who is not familiar with program languages can create a model built-in program easily. Embodiments on a three-dimensional CAD model creating apparatus according to the present invention are explained below with reference to drawings. The present invention is not limited by the embodiments.

First Embodiment

A three-dimensional CAD model creating apparatus according to a first embodiment uses a generally available three-dimensional CAD software program that includes the parametric transformation function and the programmed transformation function that are already described above.

FIG. 1 is a schematic diagram that depicts a configuration of a three-dimensional CAD model-creating apparatus according to the first embodiment. In FIG. 1, a three-dimensional CAD model creating apparatus 1 includes a ROM, a RAM, and a hard disk device, and includes a storage unit 2 that stores various data; a control unit 3 that executes operations, such as operations according to the first embodiment of the present invention and control operation of the whole of the three-dimensional CAD model creating apparatus 1 by causing a processor, such as a CPU, to execute programs including the above-described three-dimensional CAD software program; an input unit 4 that includes a keyboard and a pointing device, and receives user's input for operating the three-dimensional CAD model creating apparatus 1; and a display unit 5 that includes a CRT or a liquid crystal display, and outputs display on various operation results to the user.

The control unit 3 further includes a three-dimensional CAD software-program unit 31, a data converting unit 32, and a table creating unit 33. The three-dimensional CAD software-program unit 31 is implemented by executing the commercially available three-dimensional CAD software program described above. The data converting unit 32 and the table creating unit 33 can be units implemented by calling a program created by using an API (Application Programming Interface) of the commercially available three-dimensional CAD software program from the three-dimensional CAD software-program unit 31, or can be units implemented by an originally created program unrelated to the commercially available three-dimensional CAD software program.

The three-dimensional CAD software-program unit 31 creates a three-dimensional CAD model based on an input by the user. The three-dimensional CAD model created by the three-dimensional CAD software-program unit 31 is stored in the storage unit 2 as three-dimensional CAD model data 21. The three-dimensional CAD model data 21 includes model change logic 24 which is setting of change logic regarding the own model and incorporated in its inside. The model change logic 24 is incorporated in accordance with the registration of the model built-in program data 22, which is created by being converted from tabular data 23 as described later, to the three-dimensional CAD model data 21.

Furthermore, when the user inputs an operation for changing a certain parameter, the three-dimensional CAD software-program unit 31 transforms the three-dimensional CAD model based on the input and the model change logic 24 by using the parametric transformation function and the programmed transformation function included in the three-dimensional CAD software program.

The three-dimensional CAD software-program unit 31 further includes a model built-in program IO unit 34 that performs an operation of registering the model built-in program data 22, in which change logic is described in a program language, stored in the storage unit 2 to the three-dimensional CAD model data 21; and an operation of extracting the model built-in program data 22 from the model change logic 24, which is already incorporated in the three-dimensional CAD model data 21, to the storage unit 2. Usually, a commercially available three-dimensional CAD software program often includes the function of the model built-in program IO unit 34 in this way; however, if it does not include the model built-in program IO unit 34, the model built-in program IO unit 34 can be separately created.

The table creating unit 33 causes the display unit 5 to display an input screen in a tabular form for setting change logic that associates a changed state, which is a form after transformation, with a condition to be satisfied to shift to the changed state for each changed state. Furthermore, the table creating unit 33 stores in the storage unit 2 change logic as the tabular data 23, the change logic being input by the user based on the display by using the input unit 4. Moreover, the display unit 5 is caused to display a tabular data 23 that is already created, and when the user performs input of editing the tabular data 23 based on the display, a change through the edition is reflected in the tabular data 23.

The data converting unit 32 performs an operation of converting the tabular data 23 to create the model built-in program data 22 described in a certain program language, and an operation of converting the model built-in program data 22 to create the tabular data 23. The certain program language is not particularly limited, and can be a general-purpose program language, for example, BASIC, or can be an originally created language. The created tabular data 23 is stored in the storage unit 2. Similarly, the model built-in program data 22 created by being converted from the tabular data 23 is also stored in the storage unit 2.

The storage unit 2 stores the three-dimensional CAD model data 21 including the model change logic 24, the model built-in program data 22, and the tabular data 23, as described above.

According to the three-dimensional CAD model creating apparatus 1 of the first embodiment configured as described above, a concrete example of the tabular data 23 and the model built-in program data 22 corresponding to the tabular data 23, and operations of converting the tabular data 23 and the model built-in program data 22 into each other by the data converting unit 32, are explained below. Assuming here that the model built-in program data 22 includes part of setting change logic regarding parametric transformation and part of setting change logic regarding presence or absence of shape element similarly to the example shown in FIG. 11, a specific example and operations are explained below. The explanation is separately made for the part of setting change logic regarding parametric transformation and for the part of setting change logic regarding presence or absence of shape element.

FIG. 2 is a schematic diagram that depicts an exemplar display of the tabular data 23 that sets change logic of parametric transformation onto the display unit 5. In FIG. 2, above the table of the tabular data 23, a table-name indicating row 101 the description of which indicates the name of the table is provided; a fixed index name that is easily understandable, such as "table name", is described above the first column cells of the table; and on the right side, the name of the tabular data 23 of the example, which is "part outer dimensions", is described.

At the ends of the columns and the rows of the tabular data 23, ending indexes 102 and 103 are described. According to the example, although "END" is used as the ending indexes 102 and 103, another description can be used as long as it is fixed to a certain description.

In the first row of the tabular data 23, described is a branched-result column index 104 that indicates a column of which right-hand columns and itself are columns indicating results of conditional branching. In the second row, provided is an explanation row 105 in which an explanation of a variable name assigned to each column can be freely described. In this row, in a cell in the first column from the left, a fixed index name, such as "explanation", is described.

In the third row of the tabular data 23, provided is a variable name row 106 in which the name of a parameter assigned to each column is to be described. In this row, in a cell in the first column from the left, a fixed index name, such as "variable name", is described. In the fourth row, provided is a logic row 107 for describing therein logic for associating the parameter name of each column described in the variable name row 106 with the value of each column of value setting rows 108, which will be described later. In the columns of branching conditions of the logic row 107, various kinds of comparative operators, such as > and <, are selected as required, and described in respective columns. Although "=" denoting substitution is described in all of the columns of branching conditions in the example, description can be simplified. A converting rule can be set such that, for example, when description in a cell of logic is omitted in a case of a branched result, it is considered as "=".

At and below the fifth row of the tabular data 23, provided are the value setting rows 108 for setting a value into a logical expression that is composed of a parameter name of each column described in the variable name row 106 and logic of each column described in the logic row 107. In the row 108, change logic that associates a changed state as a form after transformation with a condition to be satisfied to shift to the changed state is described. According to the example, for example, change logic described in the value setting row 108 in the fifth row is interpreted such that when conditions of "SIZE" being "large", "OPTION" being "N/A", "FORCE>=0", and "FORCE<100" are satisfied, a changed state is that the value of "WIDTH" is 1000, the value of "DEPTH" is 300, and the value of "HEIGHT" is 20.

FIG. 3 is a schematic diagram for explaining part of the model built-in program data 22 corresponding to the tabular data 23 shown in FIG. 2. It is assumed here that the model built-in program data 22 is described in a language similar to BASIC. To clarify a distinction between a comparative operator expressing equality and an assignment operator, the former is denoted by "==", and the latter is denoted by "=".

In FIG. 3, provided are a table-starting comment row 201 into which the description of the table-name indicating row 101 is converted and described; table-attribution comment rows 202 in which the size of the tabular data 23, the column position of the branched-result column index 104, and the descriptions in the explanation row 105, the variable name row 106, and the logic row 107 are converted and described; and logic description rows 203 into which the descriptions in the value setting rows 108 are converted and described.

The logic description rows 203 include the descriptions of respective rows of the value setting rows 108 and a plurality of respectively corresponding pieces of conditional branching logic. A conditional branching logic 204 and a conditional branching logic 205 corresponding to the value setting row 108 of the fifth row in the field and the value setting row 108 of the 12th row, respectively, are shown here, and descriptions of the others of the value setting rows 108 are omitted.

After the logic description rows 203, a table-ending comment row 206 indicating the end of the table is described. There is a case where the three-dimensional CAD model data 21 includes a plurality of shape elements, and a plurality of sets of the tabular data 23 is created by the table creating unit 33. In this case, in the model built-in program data 22, rows from the table-starting comment row 201 to the table-ending comment row 206 correspond to one set of the tabular data 23, and are described so as to correspond to each set of the tabular data 23 by using the name of a table described in each of the table-starting comment row 201 as an index. An index other than the table name can be used by giving data by additionally setting, such as a table number, as an index.

Because the commercially available three-dimensional CAD software program is not manufactured on the assumption of the application to the first embodiment of the present invention, it does not include a description format dedicated for associating the tabular data 23 with the model built-in program data 22, which is extracted by the model built-in program IO unit 34 included in the three-dimensional CAD software-program unit 31 implemented by the present software program. For this reason, according to the first embodiment, when creating the model built-in program data 22 as described in the table-starting comment row 201, the data converting unit 32 is configured to cause the model built-in program data 22 to have the table-starting comment row 201, the table-attribution comment rows 202, and the table-ending comment row 206 (hereinafter, these three rows are referred to as table data information) in order to associate the model built-in program data 22 with the tabular data 23, by using a comment description format according to the program language. Accordingly, when creating the tabular data 23 from the model built-in program data 22, the data converting unit 32 can determine whether a sentence described in the comment description format is just a comment description or table data information, in accordance with "'HYO::'", that is, based on whether it is a comment row starting with the table-starting comment row 201. Furthermore, the data converting unit 32 can acquire a format, such as the size, of the tabular data 23 to be created, from the table-attribution comment rows 202 including information on the number of columns and the number of rows among the table data information.

Needless to say, by describing not only table data information but also various information into the model built-in program data 22 in the comment description format as required, the three-dimensional CAD model data 21 can have the various information.

According to the example in FIG. 2, although numerical values and character strings are described in the value setting rows 108, those can be a mathematical expression as shown in FIG. 4 (a). In such case, a converted result by the data converting unit 32 is the model built-in program data 22 shown in FIG. 4 (b).

An example of the stored tabular data 23 according to FIG. 2 in the storage unit 2 is shown in FIG. 5. As shown in FIG. 5, it is preferable to store the tabular data 23 into the storage unit 2 in a CSV format, in which each cell is separated by a comma. Although it is described in a text file because it is, easy for a user to understand it, it can be a binary file, and moreover, a delimiter can be any delimiter as long as it can separates fields.

Figure 6:
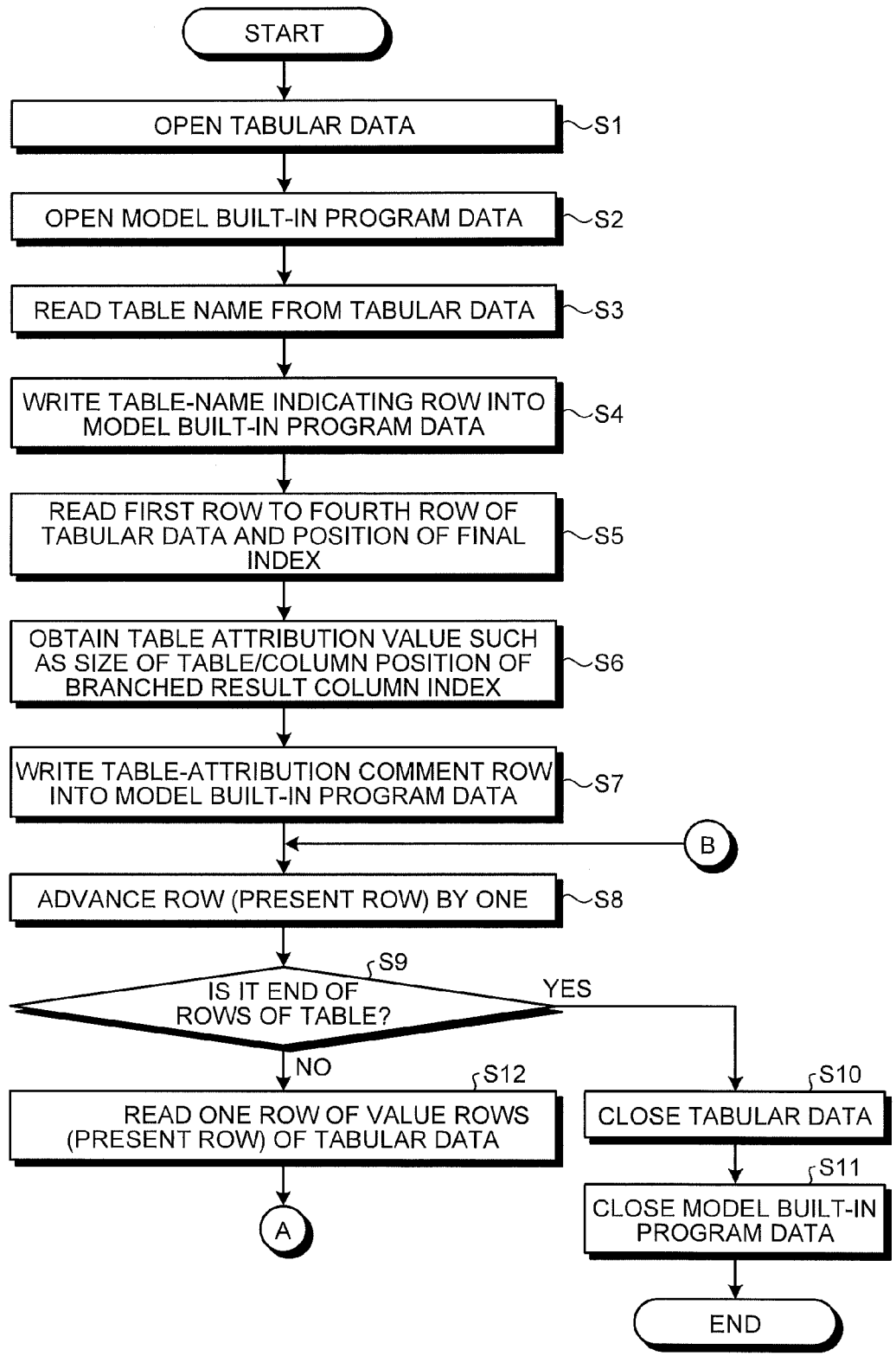
FIG. 6 is a flowchart that explains an operation for creating model built-in program data by a data converting unit.
Figure 7:
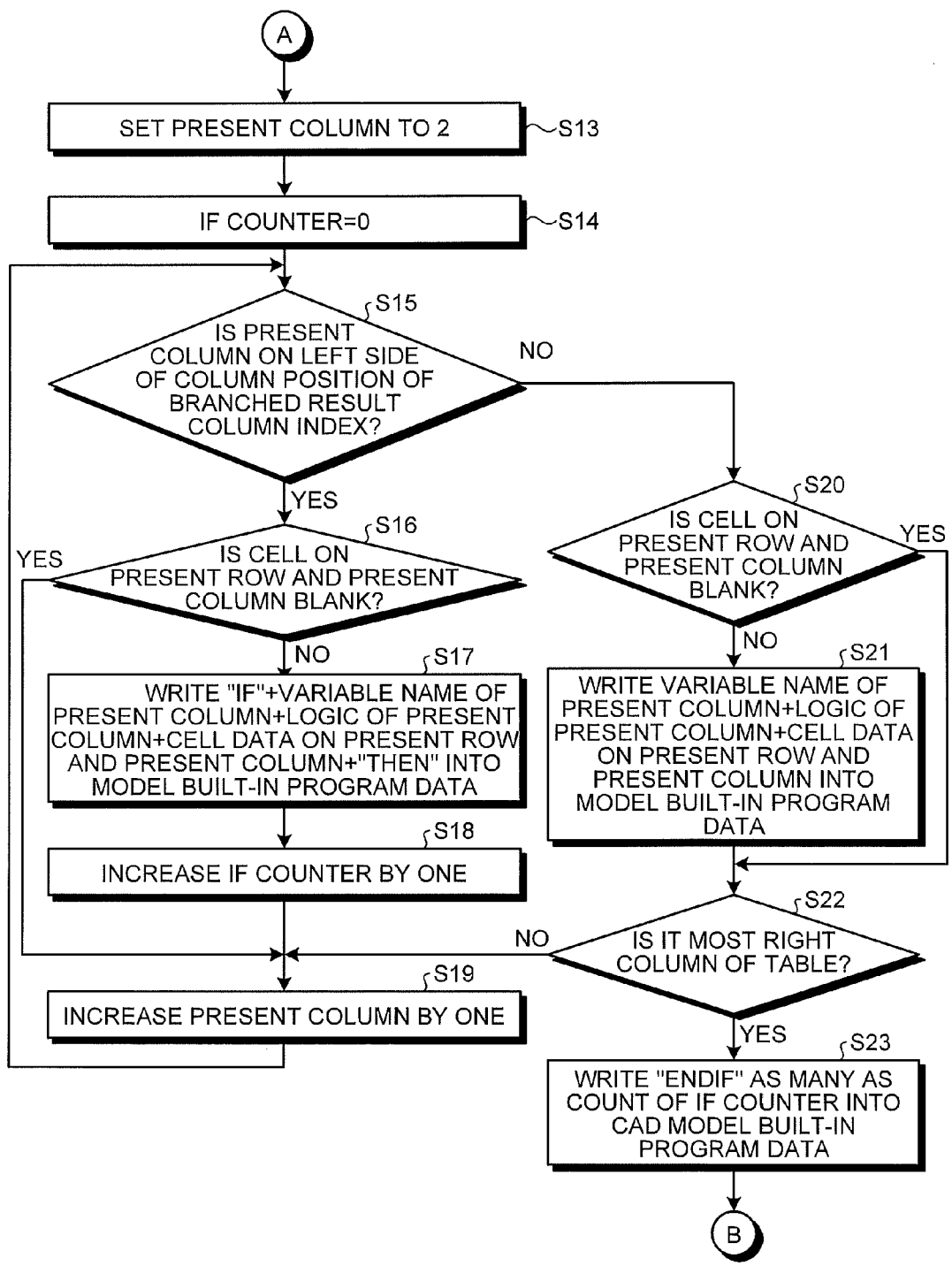
FIG. 7 is a flowchart that explains the operation for creating the model built-in program data by the data converting unit.

Subsequently, an operation that the data converting unit 32 creates the model built-in program data 22 shown in FIG. 3 from the tabular data 23 regarding the change logic of parametric transformation shown in FIG. 2 is explained below. FIGS. 6 and 7 are flowcharts that explain the operation.

To begin with, the data converting unit 32 opens the tabular data 23 shown in FIG. 2 (Step S1); and opens the corresponding model built-in program data 22 of the three-dimensional CAD model data 21 (Step S2). Subsequently, the data converting unit 32 reads a table name described in the table-name indicating row 101 from the opened tabular data 23 (Step S3); and writes the table-starting comment row 201 into the model built-in program data 22 based on the read table name (Step S4). Furthermore, the data converting unit 32 reads descriptions from the first row to the fourth row of the tabular data 23 and positions of the ending indexes 102 and 103, respectively (Step S5). The data converting unit 32 then obtains the number of columns and the number of rows of the table from the positions of the ending indexes 102 and 103, and obtains which column is the branched-result starting column from the branched-result column index 104 (Step S6). The data converting unit 32 then writes the table-attribution comment row 202 into the model built-in program data 22 based on the obtained content (Step S7).

Subsequently, the data converting unit 32 advances the reading row of the tabular data 23 by one (Step S8). The data converting unit 32 then determines whether the present reading row is the final row of the tabular data 23 (Step S9); if it is the final row (Yes at Step S9), the data converting unit 32 closes the tabular data 23 (Step S10), closes the model built-in program data 22 (Step S11), and terminates the operation.

If the present reading row is not the final row of the tabular data 23 (No at Step S9); the data converting unit 32 reads the values of one row from the present reading row of the tabular data 23 (Step S12). In FIG. 7, the data converting unit 32 then sets the present reading column of the values of the read one row to 2 (Step S13); and sets the IF counter, which is for counting the number of IF sentences, to zero (Step S14).

Subsequently, the data converting unit 32 determines whether the present reading column is on the left side of the branched-result column index 104 (Step S15). If the present reading column is on the left side of the branched-result column index 104 (Yes at Step S15); the data converting unit 32 further determines whether a cell specified by the present reading row and column is blank (Step S16). If the cell is not blank (No at Step S16); "IF", the variable name of the present reading column, the logic of the present reading column, the value of the cell specified by the present reading row and column, and "THEN" are connected into one line, and written into the model built-in program data 22 (Step S17). The data converting unit 32 then increments the IF counter (Step S18); advances the present reading column by one (Step S19); and goes to Step S15. At Step S16, if the cell is blank (Yes at Step S16); the data converting unit 32 goes to Step S19.

At Step S15, if the present reading column is not on the left side of the branched-result column index 104 (No at Step S15); the data converting unit 32 further determines whether a cell specified by the present reading row and column is blank (Step S20). If the cell is not blank (No at Step S20); the variable name of the present reading column, the logic of the present reading column, and the value of the cell specified by the present reading row and column are written into the model built-in program data 22 (Step S21). The data converting unit 32 then determines whether the present reading column is the most right column of the table (Step S22); if it is not the most right column (No at Step S22), the data converting unit 32 moves to Step S19; if it is the most right column (Yes at Step S22), the data converting unit 32 writes "ENDIF" as many as the number of the value of the IF counter into the model built-in program data 22, and goes to Step S8 in FIG. 6. At Step S20, if the cell is blank (Yes at Step S20); the data converting unit 32 goes to Step S22.

In this way, the data converting unit 32 of the three-dimensional CAD model creating apparatus 1 according to the first embodiment creates table data information from the already created tabular data 23, in which change logic regarding parametric transformation is set, then writes the created table data information into the model built-in program data 22. Furthermore, the data converting unit 32 reads the value setting rows 108 one row by one row, then writes logic of a conditional branch, which corresponds to each of the value setting rows 108, into the model built-in program data 22 in the program language. Similarly, the data converting unit 32 sets the size of the table and the table name from the table data information according to the inverse logic to the operation shown in FIGS. 6 and 7. Furthermore, the data converting unit 32 creates the value setting rows 108 by converting the logic of the conditional branches regarding parametric transformation of the model built-in program data 22 described in the program language. At that time, the data converting unit 32 creates one set of the tabular data 23 from a part between the table-starting comment row 201 and the table-attribution comment row 202 in the model built-in program data 22.

The tabular data 23 in which change logic regarding presence or absence of shape element is set, and a part of the model built-in program data 22 corresponding to the tabular data 23 are explained below. When setting change logic regarding presence or absence of shape element by using the tabular data 23, used is the tabular data 23 in a format other than the format of the tabular data 23 described above that sets change logic regarding parametric transformation.

To begin with, the user writes into the tabular data 23 a list of IDs of shape elements defined in the three-dimensional CAD model data 21. FIG. 8 is a schematic diagram that depicts the tabular data 23 in which a list of IDs of shape elements (a shape element list 301) is written. According to the three-dimensional CAD model data 21, usually, because the order of shape elements in which the shape elements are registered also has meaning, the IDs of shape elements in FIG. 8 are described in accordance with the order. It is convenient here to configure such that, for example, the data converting unit 32 extracts shape elements registered to the three-dimensional CAD model data 21 from the data 21 via the model built-in program IO unit 34, and creates the list of the shape elements shown in FIG. 8. The user adds a column of a desired branching condition to the tabular data 23 in FIG. 8, and sets change logic.

FIG. 9 is a schematic diagram for explaining an example of display of the tabular data 23 in which setting of change logic regarding presence or absence of shape element is written. According to the tabular data 23 of change logic regarding presence or absence of shape element, there are only two kinds of branched results: for example, if branching conditions are satisfied, it is present; if unsatisfied, it is absent. Therefore, the tabular data 23 is configured to be created based on a rule that a case of satisfaction of branching conditions indicates a changed state of the presence, while omitting columns of branched results, differently from the case of the tabular data 23 of the change logic regarding the parameters shown in FIG. 2. The tabular data 23 of change logic regarding presence or absence of a shape element can be configured to prepare columns indicating branched results.

In the tabular data 23 shown in FIG. 9, in a case where when a plurality of conditions connected by the logic of AND is satisfied, a shape element is present; the branching conditions of the shape element connected by AND are described by using a plurality of columns of the branching conditions in one row. In a case where when a plurality of conditions connected by the logic of OR is satisfied, a shape element is present; each of the branching conditions of the shape element is described by using each of a plurality of rows that are different each other. For example, an additional row 302 is a row that is added for expressing a branching condition of the shape element 3. More specifically, the change logic of the shape element 3 is set such that when at least one of "SIZE" being "large" and "OPTION" being "applied" is satisfied, the shape element 3 turns to a changed state that the shape element 3 is present in the three-dimensional CAD model data 21.

Subsequently, change logic interpretation by the data converting unit 32 when converting the tabular data 23 shown in FIG. 9 into the model built-in program data 22 is explained below. Similarly to the case of creating the model built-in program data 22 from the tabular data 23 regarding change logic of parametric transformation, when converting the tabular data 23 that sets change logic regarding presence or absence of shape element, the data converting unit 32 creates table data information and reads and converts the shape element list 301 one row by one row.

Although there is no description of condition in the row of the shape element 1, such row is interpreted that the element is present in the three-dimensional CAD model data 21 without condition, and the interpreted content is written into the model built-in program data 22. Regarding the row of the shape element 2, the data converting unit 32 writes into the model built-in program data 22 such that the shape element 2 is present in the three-dimensional CAD model data 21 when the "OPTION" is "applied".

When there is an additional row, the data converting unit 32 converts a branching condition, which is read and converted immediately before the additional row, and a branching condition, which is read and converted from the additional row, so as to be connected by the logic of OR. Because the shape element 3 has two rows, they are treated with OR, so that when at least one of a case where "SIZE" is "large" and a case where "OPTION" is "applied" is satisfied, the shape element 3 is interpreted as it is present. In the row of a shape element 7, the data converting unit 32 interprets that the shape element 7 is present in a case where "FORCE>=0" and "FORCE<100".

In this way, the data converting unit 32 converts the tabular data 23 regarding presence or absence of shape element, and writes it into a change logic setting part regarding presence or absence of shape element in the model built-in program data 22. Moreover, similarly to the operation of creating the tabular data 23 regarding parametric transformation from the change logic setting part regarding parametric transformation in the model built-in program data 22 described above, the data converting unit 32 creates the tabular data 23 regarding presence or absence of shape element from the change logic setting part in the model built-in program data 22.

Although a row without description of condition is also considered to indicate presence in the model built-in program data without condition in the example, it can be configured to express presence without condition by using a specific notation, such as "–".

Alternatively, as shown in FIG. 10, a format different from the exemplar display of the tabular data 23 shown in FIG. 9 can be used. According to an exemplar display of the tabular data 23 shown in FIG. 10, variable names and their values are all described in a logic row 407, and branching conditions are expressed in a tabular form by describing "O" in a value setting row 401 when a condition is applied. It can be configured such that negation of a condition described in a logic row is specified with a description of "X". Alternatively, by providing a logic row of "unconditional", it can be configured such that a description of "O" in the logic row leads to presence of a corresponding shape element in the model built-in program data 22 without condition.

According to the display examples in FIGS. 9 and 10, when branching conditions are plural and set with conditions of AND and OR, the interpretation of AND is performed in the column direction of the table, and the interpretation of OR is performed in the row direction; however, the interpretation of AND can be performed in the row direction, and the interpretation of OR can be performed in the column direction.

Moreover, when setting the change logic regarding presence or absence of shape element, it can be configured to be capable to set presence or absence of a component including a plurality of shape elements:

Furthermore, according to the explanations described above, formats of the tabular data 23 of change logic regarding parametric transformation and the tabular data 23 of change logic regarding presence or absence of shape element are separated, and the data converting unit 32 is configured to create respective different sets of the tabular data 23 from one piece of the model built-in program data 22; however, the data converting unit 32 can be configured to create one set of the tabular data 23 into which the tabular data 23 of change logic regarding parametric transformation and the tabular data 23 of change logic regarding presence or absence of shape element are joined, from one piece of the model built-in program data 22.

As described above, according to the first embodiment, because it is configured to convert change logic input in tabular data and to create a model built-in program described in a program language, a user who is not familiar with the program language can create the model built-in program. Moreover, because it is configured to convert the model built-in program created in this way into tabular data that has good visibility, when a third person performs a diversion of a three-dimensional CAD model in which change logic is set, the change logic can be understood easily. In addition, because unique correspondence relation is ensured between the tabular data and the model built-in program, the tabular data can be used as specifications for explaining the three-dimensional CAD model.

Second Embodiment

According to a second embodiment, a commercially available spreadsheet software program is used for the table creating unit 33, and the tabular data 23 is configured to be stored in the storage unit 2 in a data format of a storage format adopted to the spreadsheet software program. The data converting unit 32 converts the tabular data 23 in the storage format and the model built-in program data 22 stored in the storage unit 2 into each other.

For example, assuming that a plurality of sets of the tabular data 23 are on respective different sheets, and a spreadsheet software program that can store those sheets in one file is used as the table creating unit 33, respective sets of the tabular data 23 in FIGS. 2, 9 and 10 can be stored as one file. Moreover, for example, as respective sets of the tabular data 23 in FIGS. 2, 9 and 10 are arranged in one spreadsheet software program file, sheets corresponding to respective target functional description sections in the model built-in program data 22 can be arranged, accordingly, the tabular data 23 that is better organized can be configured.

In this way, according to the second embodiment, because it is configured to use a commercially available spreadsheet software program as the table creating unit, the table creating unit does not need to be created, the three-dimensional CAD model creating apparatus can be produced efficiently, and a user can use various functions included in the commercially available spreadsheet software program.

Third Embodiment

Although the control unit 3 according to the first embodiment is configured to include the three-dimensional CAD software-program unit 31 implemented by a commercially available three-dimensional CAD software program, and the data converting unit 32 and the table creating unit 33 implemented by an added program; needless to say, it can be configured to implement the three-dimensional CAD software-program unit 31, the data converting unit 32, and the table creating unit 33 by creating a three-dimensional CAD software program incorporating a program that implements the data converting unit 32 and the table creating unit 33, and causing a controller that includes, such as a CPU, to execute the three-dimensional software program.

At that time, it is configured to allow a user to set format setting of table data information from, such as a environment setting file, and to provide a function of changing tabular data information in the three-dimensional CAD model data 21 based on the format setting when the model built-in program IO unit 34 extracts the model built-in program data 22 from the three-dimensional CAD model data 21.

By configuring in this way, according to a third embodiment, the user can get out tabular data in a desired format from the three-dimensional CAD model data, thereby making the change logic of the three-dimensional CAD model data to be easily understandable for the user.

INDUSTRIAL APPLICABILITY

As described above, the three-dimensional CAD model creating apparatus according to the present invention is suitable for being applied to a three-dimensional CAD model creating apparatus that includes a parametric transformation function and a function of setting change logic.

The invention claimed is:

1. A three-dimensional CAD model creating apparatus comprising:
   a processor executing program modules for:
      creating, by a table creating program module, tabular data that describes change logic for each changed state, the change logic associating a changed state with a logic condition to be satisfied to shift to the changed state, the change logic including a conditional branch, the changed state being a shape and a structure of the three-dimensional CAD model after transformation of the three-dimensional CAD model;
      converting, by a data converting program module, each change logic set in the created tabular data into a description in a certain program language, and creating a model built-in program that includes each description in the certain program language;
      registering, by a model built-in program IO program module, the created model built-in program to the three-dimensional CAD model; and
      transforming, by a three-dimensional CAD software program module, the three-dimensional CAD model when receiving an operation for transforming the three-dimensional CAD model, based on the operation and change logic described in the registered model built-in program; and
   a memory for storing the model built-in program.

2. The three-dimensional CAD model creating apparatus according to claim 1, wherein when creating the model built-in program from the tabular data, the data converting program module creates table data information, which is information on a table format including number of columns and number of rows of the tabular data, and writes the table data information into the model built-in program by using a comment format of the certain program language.

3. The three-dimensional CAD model creating apparatus according to claim 2, wherein:
   the model built-in program IO program module extracts the model built-in program from the three-dimensional CAD model, to which the model built-in program is registered; and
   the data converting program module determines a table format including number of columns and number of rows of a table based on table data information written in the extracted model built-in program, and creates tabular data by converting each change logic described in the certain program language and writing into the table the format of which is determined.

4. The three-dimensional CAD model creating apparatus according to claim 3, wherein:
   when extracting registered model built-in program, the model built-in program IO program module changes the table data information included in the model built-in program based on setting on table data information, which is previously held, and
   the data converting program module determines the table format of tabular data to be created based on the changed table data information.

5. The three-dimensional CAD model creating apparatus according to claim 1, further comprising a display unit that displays the tabular data.

6. A non-transitory computer readable medium storing a three-dimensional CAD model creating program that, if executed by a computing device, causes the computing device to perform operations comprising:
   creating, for a three-dimensional CAD model, tabular data that describes change logic for each changed state, the change logic associating a changed state that is a shape and a structure of the three-dimensional CAD model after transformation with a logic condition to be satisfied to shift to the changed state, the change logic including a conditional branch;
   converting each change logic set in the created tabular data into a description in a certain program language, and creating a model built-in program that includes each description in the certain program language;
   registering the created model built-in program to the three-dimensional CAD model; and
   transforming the three-dimensional CAD model when receiving an operation for transforming the three-dimensional CAD model, based on the operation and change logic described in a model built-in program registered to the three-dimensional CAD model.

7. A non-transitory computer readable medium storing a three-dimensional CAD model creating program that, if executed by a computing device, causes the computing device to perform operations comprising:
   converting each change logic set in tabular data, which describes the change logic for each changed state, into a description in a certain program language in order to create a model built-in program that includes each description in the certain program language,
      the tabular data being created for a three-dimensional CAD model by using a general spreadsheet software program,
      the change logic associating a changed state that is a shape and a structure of the three-dimensional CAD model after transformation with a logic condition to be satisfied to shift to the changed state, the change logic including a conditional branch;
   registering the created model built-in program to the three-dimensional CAD model; and
   transforming the three-dimensional CAD model when receiving an operation for transforming the three-dimensional CAD model, based on the operation and change logic described in a model built-in program registered to the three-dimensional CAD model.

* * * * *